B. D. LOCKWOOD.
SIX-WHEEL TRUCK.
APPLICATION FILED OCT. 4, 1917.

1,251,674.

Patented Jan. 1, 1918.
3 SHEETS—SHEET 1.

Witnesses
H. M. Bender
Frank E. Miller

Inventor
Burus D. Lockwood,
A. Laube,
Attorney

B. D. LOCKWOOD.
SIX-WHEEL TRUCK.
APPLICATION FILED OCT. 4, 1917.

1,251,674.

Patented Jan. 1, 1918.
3 SHEETS—SHEET 3.

Witnesses
H. M. Bender
Frank E. Miller

Inventor
Burns D. Lockwood,

By
S. Hambe,
Attorney

UNITED STATES PATENT OFFICE.

BURNS D. LOCKWOOD, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

SIX-WHEEL TRUCK.

1,251,674.     Specification of Letters Patent.     Patented Jan. 1, 1918.

Application filed October 4, 1917. Serial No. 194,694.

*To all whom it may concern:*

Be it known that I, BURNS D. LOCKWOOD, a citizen of the United States, residing in Bellevue, in the county of Allegheny and State of Pennsylvania, have invented certain new and useful Improvements in Six-Wheel Trucks, of which the following is a specification.

This invention relates to improvements in trucks of a type which is at present being largely used in military and other operations in conjunction with temporary tracks of various gages, and has as an object the simplification of and the reduction to a minimum of a number of individual parts forming the truck.

Another object of the invention is to provide a substantially unitary construction of truck when assembled having a maximum of strength with a minimum of weight to facilitate handling in field or other operations.

Another object of the invention is to provide an equalizing system which is adapted to cause the weight of the truck or any load carried thereon to be supported at all times vertically of the center of the axle journal, and will, in the event of a greater portion of the load coming on one journal, equally distribute such load to the remaining journals to equalize the load over all of the journals at one or both sides of the truck.

A further object of the invention is to provide simple and efficient devices for rockably mounting the equalizing levers on the journal boxes of the truck, and further to provide means for holding such devices in operative positions.

These and other objects will be apparent from the specification and appended claims.

Figure 1:
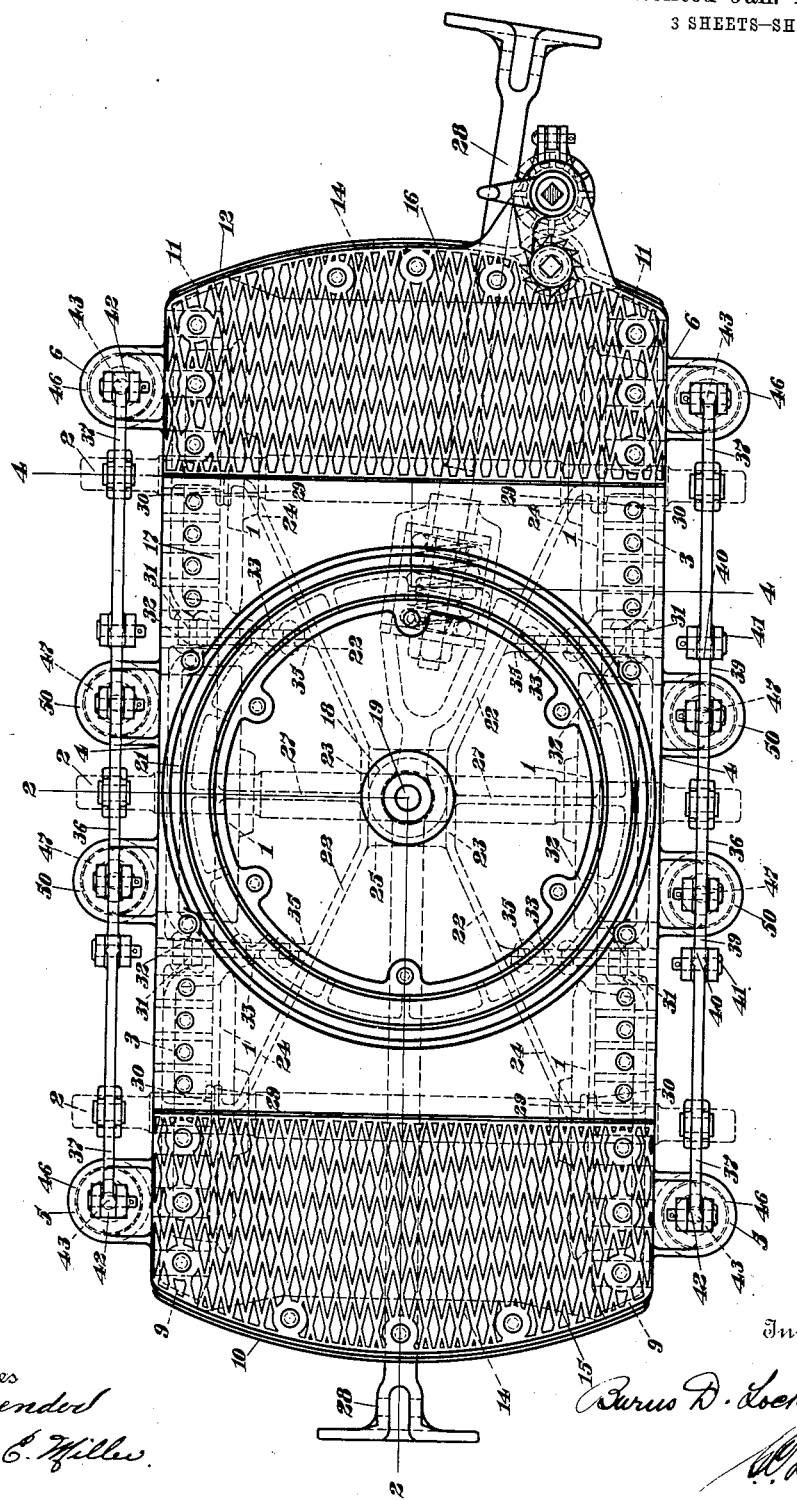
Figure 2:
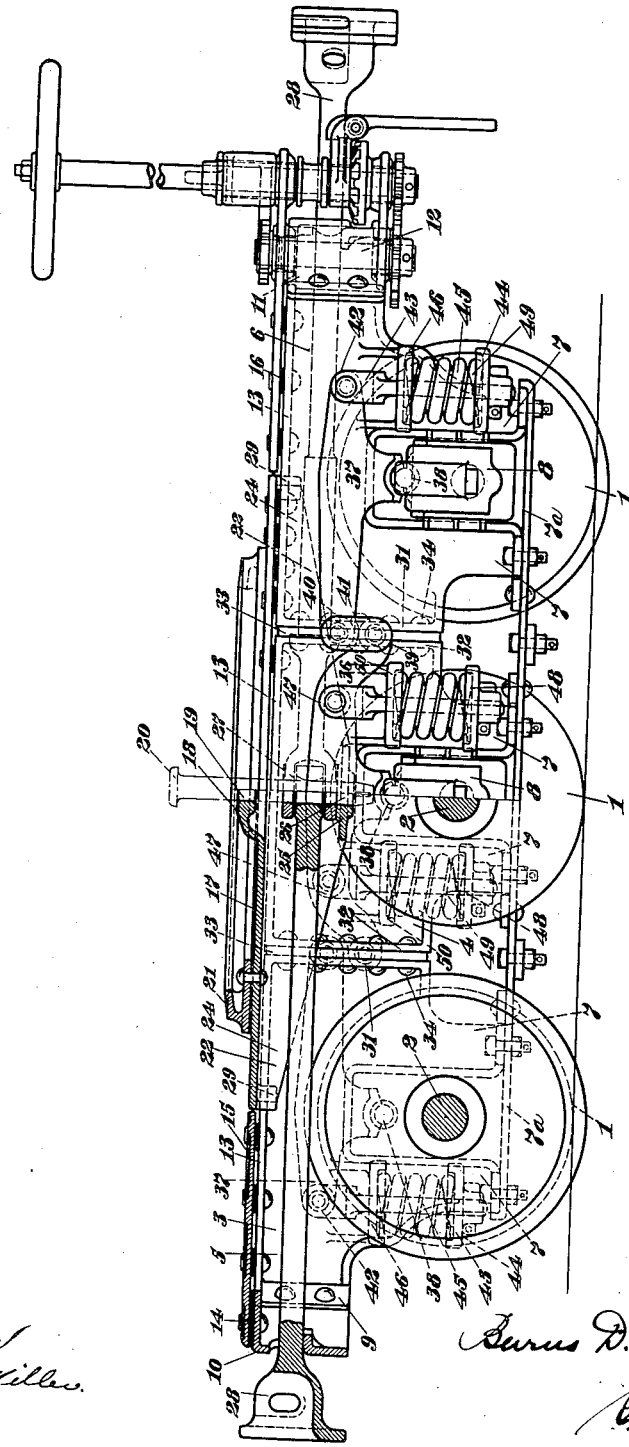
Figure 3:
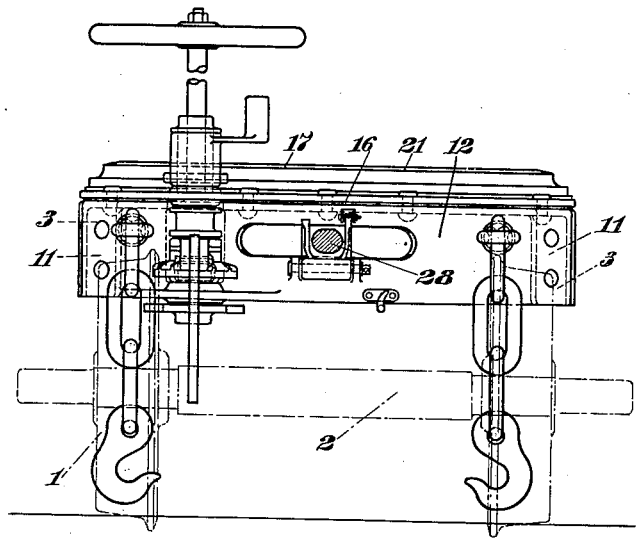
Figure 4:
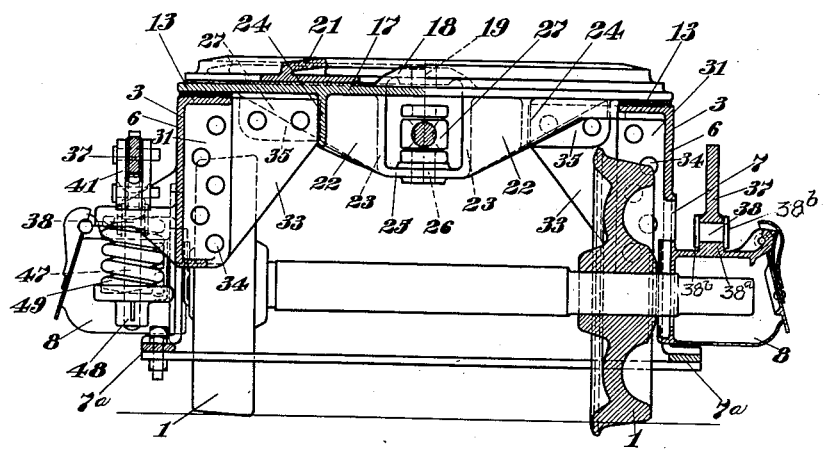

Referring now to the drawings, Figure 1 is a plan view of a truck constructed in accordance with the invention. Fig. 2 is a composite view, the right hand half being a side elevation of the truck and the left hand half being a sectional view taken on the line 2—2 of Fig. 1; Fig. 3 is an end elevational view of the truck, and Fig. 4 is a cross sectional view taken on the line 4—4 of Fig. 1.

Referring now in detail to the drawings, 1 indicates the wheels of the truck which are mounted on axles 2. 3 indicates the side frames each of which comprises a central section 4 and end sections 5 and 6, each of such sections having leg portions 7 which form pedestal jaws for the reception of the journal boxes 8 which are mounted on the journals of the axles 2 in the usual manner.

The end sections 5 of the side frames are provided with end flanges 9 to which a transversely extending end sill 10 is secured and the end sections 6 are provided with end flanges 11 to which a transversely extending end sill 12 is secured. All of the side frame sections are provided with horizontally disposed flanges 13 which extend inwardly toward the longitudinal center line of the truck, and the end sills are provided with horizontally disposed flanges 14 which extend inwardly toward the transverse center-line of the truck.

The floor of the truck comprises end plates 15 and 16 which extend from side frame to side frame and at their outer side portions are secured to the flanges 13 of the end sections 5 and 6 respectively, and which at their outer end portions are secured to the flanges 14 of the end sills 10 and 12 respectively.

Intermediate the plates 15 and 16 a center member 17 is provided which extends transversely of the truck from side frame to side frame and at its outer side portions is secured to the flanges 13 of all of the sections forming the side frames. The top of this member is provided with a raised portion 18 which is preferably integral therewith and forms a part of the truck center bearing, such portion having an opening 19 formed therein for the reception of a king pin 20 when a car body is applied to the truck. The top of this member is also provided with a circular roller track 21 which forms the other part of the truck center bearing and upon which rollers rotatably mounted on a car body are adapted to run. This track is preferably made separate from the member and is secured thereto by rivets or other suitable means, but it will be understood that, if desired, it may be made integral with the member.

The underside of this center member is provided with spaced strengthening ribs 22 which extend in a direction longitudinally of the truck, the central portions 23 of such ribs being parallel with the longitudinal center line of the truck and the end portions 24 diverging from such center line toward the side frames. These ribs are deepest at their central portions 23 and taper in depth therefrom to their shallowest depths at or near their ends. The central portions 23 of these ribs are connected together and strengthened by a transverse portion 25 which is preferably integral with such ribs, and which is provided with an opening 26 for the reception of the lower end portion of the king pin 20. To further strengthen the central portions 23 of the ribs and the top portion of the member integral ribs 27 are provided, each of which extends outwardly from one of the ribs 22 toward one of the side frames. It will here be noted that the top portion of the center member, the portions 23 of the ribs 22 and the transverse portion 25 form a hollow boxlike structure having open ends, adapted to receive the inner end portions 27 of the draft gears 28, such inner end portions being pivotally connected with the truck through the medium of the king pin 20, which passes through this structure and through the inner ends of the draft gears.

At the ends of the ribs 22 the center member is provided with lugs 29 which are adapted to engage with lugs 30 on the end sections 5 and 6 of the side frames, and when in such engagement these lugs will assist in holding the side frames and the center member in their proper relative positions. Each of the sections 5 and 6 of the side frames is provided at its inner end with an inwardly extending flange 31, and each of the central sections 4 is provided at each end with an inwardly extending flange 32.

At each side of the transverse and longitudinal center line of the truck, a vertically disposed plate 33 is provided which extends in a direction transversely of the truck, and at its outer end is secured to and between the flanges 31 and 32 of the side frame sections 5 and 4 respectively by rivets 34 or other suitable means. The inner end portion of this plate overlaps and is secured to a lug 35 which extends outwardly from the rib 22 and downwardly from the top of the center member, such lug being preferably integral with the center member. These plates serve to further connect the side frames and the center member together, and also strengthen the truck as a whole.

The lower ends of the leg portions 7 are tied together at each side of the truck by a bar 7ª or any other suitable means.

At each side of the truck a system of equalizing levers is provided, each of which preferably comprises a central lever 36 and end levers 37. Each one of these levers 36 and 37 at its central portion is rockably mounted on a rocker bearing member 38, which in turn is loosely mounted on a raised portion 38ª on one of the journal boxes centrally of the axle journal. Each of these bearing members is provided with end flanges 38ᵇ which engage the sides of the raised portion 38ª and the sides of the equalizing lever, thus holding the bearing member in its proper position transversely of the truck relative to the journal box and the lever. The ends 39 of the central lever 36 are connected with the adjacent ends 40 of the end levers 37 by links 41. The outer ends 42 of the levers 37 are loosely connected with links 43, the lower ends of which are provided with spring seats 44, which are movable with the links and in which the lower ends of springs 45 are seated. The upper ends of these springs are seated in spring caps 46 which are preferably integral with the end sections 5 and 6 of the side frame. The lever 36 near each end is loosely connected with a link 47, the lower end of which is provided with a spring seat 48 which is movable with the link, and in which the lower end of a spring 49 is seated. The upper end of this spring is seated in a spring seat 50 which is preferably integral with the central section 4 of the side frame. The links 43 and 47 are passed through openings formed in the spring caps and by their engagement with the metal forming such openings will prevent the levers from moving from their operative positions.

It will be noted that when these levers are connected together and to the adjacent side frame and journal boxes in the manner just described, that the weight of the truck and any load carried thereon will be supported at all times vertically of the center of the axle journal and that in the event of a greater portion of the load coming on one journal such load will be substantially equally distributed to the remaining two journals, thus equalizing the load over all of the journals at one side of the truck.

Having thus described the invention, what I claim as new and desire to secure by Letters Patent is:

1. In a truck, spaced side frames each comprising a plurality of sections, a center member connecting said frames and said sections, and transverse plates secured to the said center member and extending between and secured to said sections.

2. In a truck, a side frame comprising a plurality of connected parts, each of said parts having a pedestal jaw formed therein, journal boxes movably mounted in said jaws, axles journaled in said boxes, an equalizing lever rockably mounted on each of said boxes, links connecting said levers with said side frame, and yieldable means between the last mentioned links and side frame.

3. In a truck, spaced side frames, each comprising a plurality of sections, a center member connecting said side frames and sections, lugs on the end sections of said side frames, and lugs on said center member adapted to engage the lugs on said end sections to hold said side frames and center member in proper relative positions.

4. In a truck, spaced side frames, each comprising a plurality of sections, a center member connecting said frames, said member having longitudinal transverse ribs each diverging toward the side frames, lugs on said member extending outwardly from said ribs and plates secured to said lugs, said plates extending between and secured to said sections.

5. In a truck, spaced side frames, each comprising a plurality of spaced sections, a center member connecting said sections and side frames, lugs on said center member extending in a direction transversely of the truck, and plates secured to said lugs, said plates extending between and being secured to said sections.

6. In a truck, spaced side frames, each comprising two end sections and an intermediate section, said sections being connected together, a plurality of spring caps projecting outwardly from said intermediate section, a spring cap projecting outwardly from each of said end sections, each of said sections having a jaw formed therein, journal boxes mounted in the jaws of said sections, axles journaled in said boxes, an equalizer mounted on each of said boxes, links connecting said levers, links secured to said levers and extending through said spring caps, and springs between said links and spring caps.

7. In a truck, spaced side frames, each comprising a plurality of spaced parts, said parts having horizontally disposed top flanges, and vertically disposed end flanges, a center member resting on and secured to said horizontally disposed flanges, downwardly depending lugs on said center member and plates secured to said lugs extending between and secured to said vertically disposed flanges of adjacent sections.

8. In a truck, spaced side frames each comprising end sections and an intermediate section, each of said sections having a jaw formed therein, journal boxes mounted in the jaws of said sections, axles journaled in said boxes, a plurality of spring caps projecting outwardly from said intermediate section and arranged one on each side of the jaw, a lever rockably mounted on the journal box of the intermediate section, a link secured to said lever at each side of the jaw, both of said links passing through said spring caps, and springs interposed between said links and spring caps, levers rockably mounted on the journal boxes in the jaws of said end sections, links connecting the outer ends of said levers with said end sections and links connecting the adjacent ends of said intermediate sections.

9. In a truck, side frames, journal boxes mounted in said side frames, a rocker bearing member mounted on each of said journal boxes and an equalizer lever mounted on said bearing member, said bearing member having flanges adapted to engage said lever and boxes.

10. In a truck, side frames, journal boxes mounted in said side frames, a raised portion on each of said journal boxes, a rocker bearing member mounted on said raised portion, an equalizer lever mounted on said bearing member, and means on said bearing member adapted to engage the sides of said raised portion and said lever.

11. In a truck, side frames, journal boxes mounted in said side frames, a rocker bearing member mounted on each of said boxes, an equalizer lever mounted on said bearing member, and means adapted to hold said bearing member in operative position relative to said box and lever.

12. In a truck, side frames, journal boxes mounted in said side frames, an upwardly extending portion on each of said journal boxes, an equalizer lever above each of said journal boxes, said equalizer lever having a downwardly extending portion, and a rocker bearing member interposed between said upwardly extending portion of said journal box and the downwardly extending portion of said equalizer lever, and means on said rocker bearing member adapted to engage said portions to hold said member against movement in a direction transversely of the truck.

In testimony whereof I affix my signature in the presence of two witnesses.

BURNS D. LOCKWOOD.

Witnesses:
 FRANK E. MILLER,
 H. M. BENDER.